March 24, 1964 W. J. ROZMUS 3,125,908
WIRE STRIPPER

Filed Oct. 24, 1960 3 Sheets-Sheet 1

INVENTOR.
WALTER J. ROZMUS
BY Ray S. Pyle
for Watts, Edgerton, Pyle & Fisher
Attorneys March 24, 1964     W. J. ROZMUS     3,125,908
WIRE STRIPPER Filed Oct. 24, 1960     3 Sheets-Sheet 2

INVENTOR.
WALTER J. ROZMUS
BY Ray S. Pyle
for Watts, Edgerton, Pyle, & Fisher
Attorneys March 24, 1964 W. J. ROZMUS 3,125,908
WIRE STRIPPER Filed Oct. 24, 1960 3 Sheets-Sheet 3

INVENTOR.
WALTER J. ROZMUS
BY Ray S. Pyle
for Watts, Edgerton, Pyle & Bisher
Attorneys

United States Patent Office 3,125,908
Patented Mar. 24, 1964

3,125,908
WIRE STRIPPER
Walter J. Rozmus, Whitesboro, N.Y., assignor to Kelsey-Hayes Company, Detroit, Mich., a corporation of Delaware
Filed Oct. 24, 1960, Ser. No. 64,648
11 Claims. (Cl. 81—9.5)

This invention relates to hand operated tools, and more particularly to hand operated wire stripping tools.

For many applications it is of utmost importance that an electrical wire be free from nicks and cuts. Thus, it becomes important when stripping insulation from the wire to avoid nicking or cutting the wire during the stripping operation. It has been observed that in many instances even though the insulation is not initially sheared completely through by the shear blades, when the insulation is pulled free of the wire by moving the wire and shear blades relatively to one another, the wire becomes nicked. Now that miniaturization is the mode, the problem of nicking or cutting the wire becomes acute, especially in components subjected to vibration where a nick results in a stress concentration followed by early failure. Also, where current must be delivered in extremely accurate amounts, a nick or cut cannot be tolerated because such blemishes change the resistance.

It has been found, according to this invention, that with the proper angular relationship between blades and wire with respect to the relative movement of the wire and the shear blades, this nicking can be completely eliminated. Further it has been found that the stripping can be done repetitively, simply, and quickly without danger of wire nicking.

This invention is based upon the discovery that an insulated wire and coacting shear blade assume a natural angular relationship which differs from what would appear to be normal and proper, and that if such blades are caused to shear partially through the insulation there will be no subsequent wire damage if relative stripping movement takes place along the path of the natural angular relationship.

The object of this invention therefore, is to carry forth the establishment of this discovered principle in a mechanical device which is serviceable, dependable, and easy to use.

One of the principal objects of this invention is to provide a wire-stripping tool that will not nick the wire being stripped.

Still a further object of this invention is to provide a wire stripping tool which will cause a relative movement between the stripping blades and wire along a path which is orientated in a natural cooperative manner according to the discovery of this invention.

Still another object of this invention is to provide a wire-stripping tool with shear blade and gripping jaw design which will establish a natural path of relative travel between the wire and the shear blades.

A more particular object of this invention is to provide a wire-stripping tool which has gripping jaws to position a wire to be stripped at a preselected angle with respect to stripping blades and which tool will cause the wire to be moved relatively with respect to the blades on a preselected path of travel.

A still more specialized object of this invention is to provide a wire-stripping tool having gripping jaws that will clamp wire to be stripped at a predetermined angle with respect to a pair of mated shear blades, and will cause the blades to partially cut through the wire insulation and will thereafter cause a relative movement between the blades and the wire to strip the insulation from the wire.

A related object of this invention is to provide a wire-stripping tool which has shear blades formed such that when the wire and blades are moved relatively to strip the insulation, there is a force created on a part of the insulation being stripped to urge it over the blades to form a protective pad on the cutting surfaces.

A still more particular related object of this invention is to provide a wire-stripping tool in which there are two blades each of which is formed with an inclined face and a reference face in which the reference face and inclined face of each meet at an angle to form a cutting edge, and in which the two reference faces are mated along a path of contact and which blades establish a natural path of relative travel of a wire inclined from normal to the path of contact an amount equal to a predetermined amount, and which predetermined amount is a function of the angles of the reference faces and inclined faces.

Other objects and a fuller understanding of the invention may be had by referring to the following description and claims taken in conjunction with the accompanying drawings in which:

Figure 1:
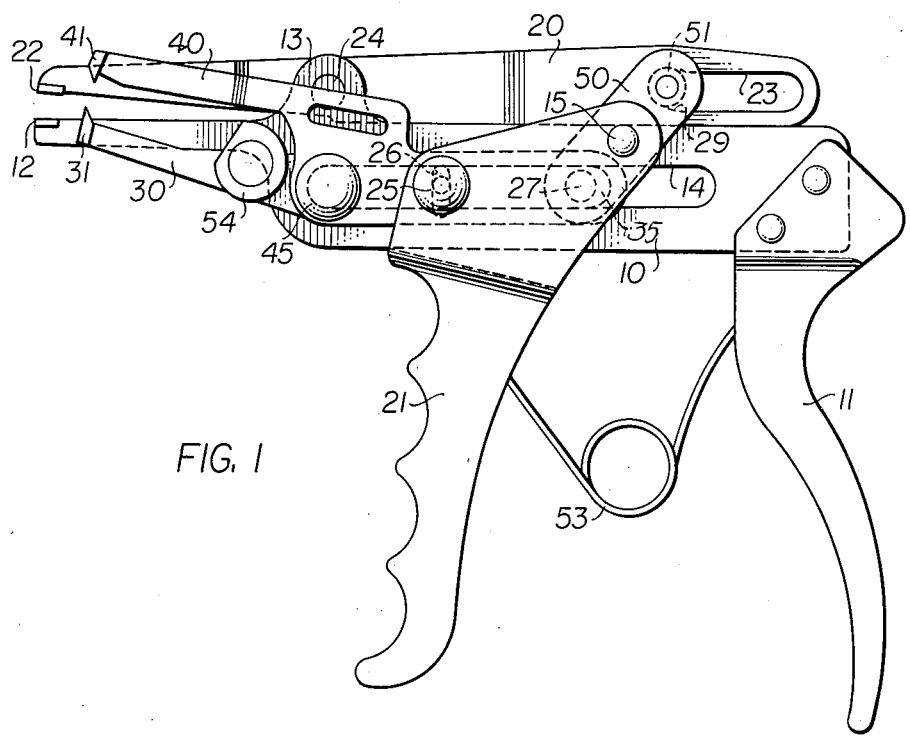
FIGURE 1 is a side elevational view of the wire-stripping tool with the gripping jaws and shear blades in an open position and the shear blades in a forward position.
Figure 2:
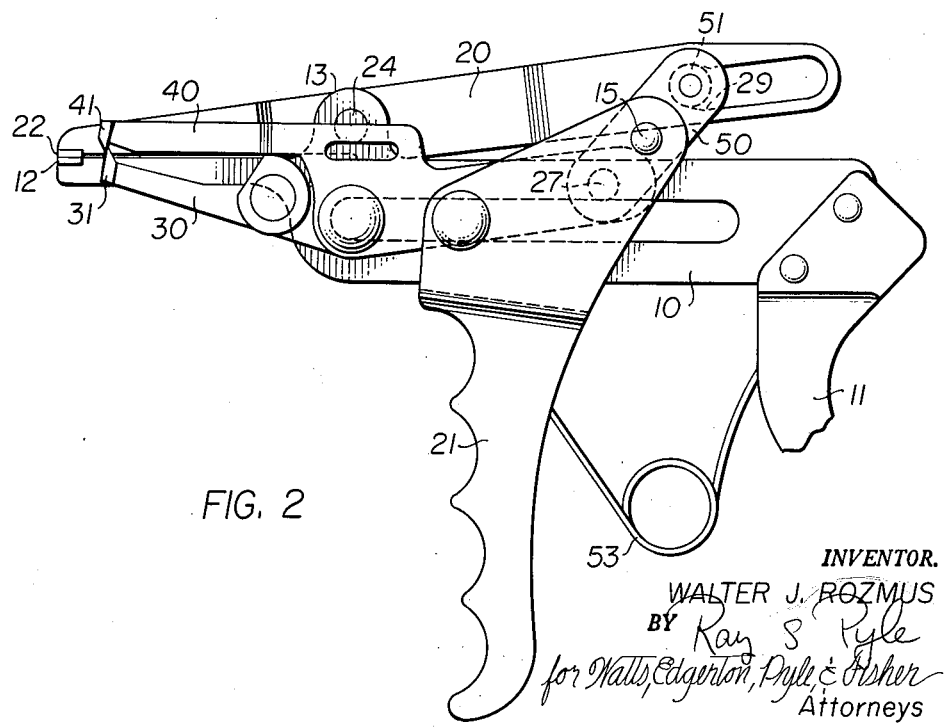
FIGURE 2 is the device of FIGURE 1 with the gripping jaws and shear blades in a closed position and the blades in a forward position.
Figure 3:
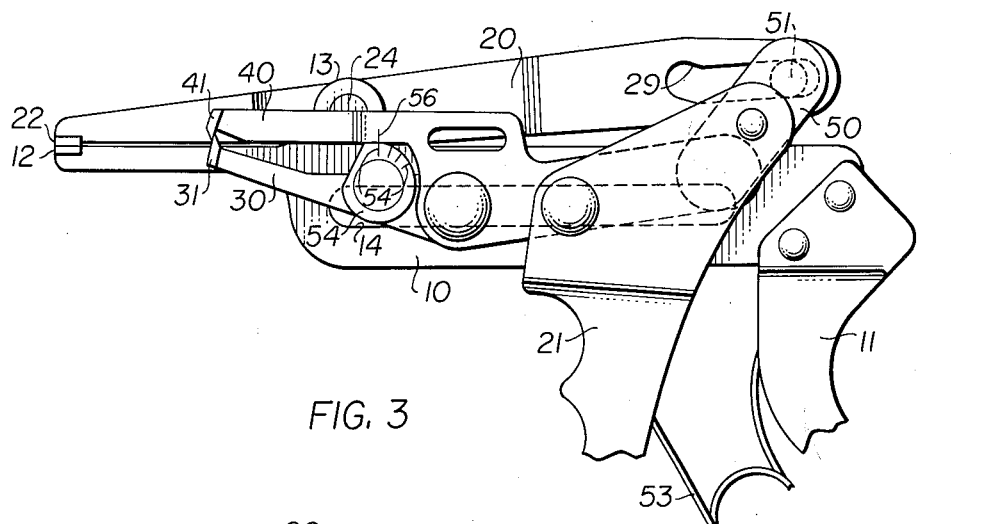
FIGURE 3 is the device of FIGURE 1 with the gripping jaws and shear blades in a closed position and the shear blades in a rearward position.
Figure 4:
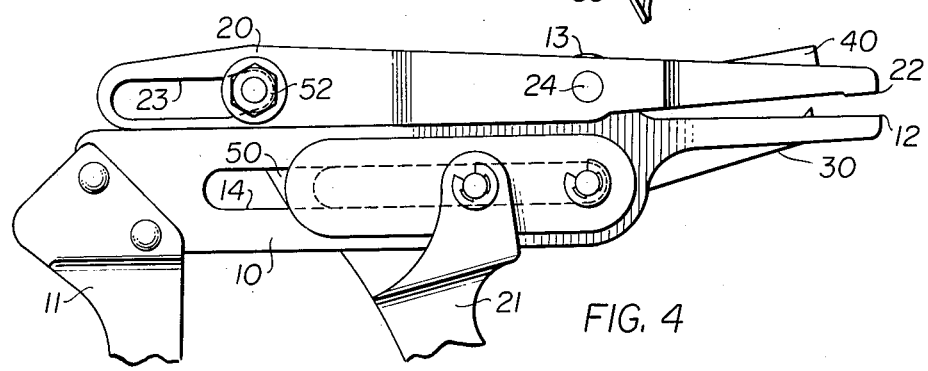
FIGURE 4 is a rear view of the device of FIGURE 1.

Referring now to the drawings and particularly FIGURES 1 through 4, a wire-stripping tool embodying the principles of this invention has a lower frame member 10 with a fixed handle 11 at one end and a wire gripping jaw 12 at the opposite end. A pivot tab 13 is formed intermediate the ends of this frame member 10.

An upper frame member 20 is provided having a wire-gripping jaw 22 at one end and an elongated camming slot 23 at the opposite end. The frame member 20 is pivotally mounted to the frame member 10 at the pivot tab 13 by a pivot pin 24. This type of mounting provides a pivotal movement of a rocker arm type between the frame members.

A pair of cooperating insulation cutting and stripping knives 30 and 40, having end blades 31 and 41 respectively, cooperate to close upon the wire, partially cut through the insulation, and thereafter serve as a restricted orifice through which the wire can pass, but not the insulation.

The shearing and stripping action carried out by this embodiment of the invention is accomplished by causing the knives 30 and 40 to close to a predetermined spaced position, and thereafter be drawn away from the gripping jaws 12 and 22.

The upper knife 40 is made to close upon the knife 30. Both knives 30 and 40 are mounted on the frame member 10 to slide in a fixed rectilinear path.

To accomplish such slide action, a slot 14 is formed in frame member 10, a slide carriage 35, in the form of a strip plate having an elongated boss fitted to the slot 14 is reciprocably movable relative to the frame 10. Pins 25 and 45 fix the knife 30 to the carriage 35.

The knife 40 is pivoted intermediate its ends on the pin 45. A slot 26 allows the pin 25 to pass through knife 40 without restricting its pivotability.

In the operation of this tool, it is intended that the gripping jaws close upon the wire at least as soon as the knife blades, if not before. Hence, the tool is designed such that the ends of the frame 20 and knife 40 pivot about the pins 24 and 45 in that order. This function is carried out by a link 50 pivotally connected at its opposite ends by a pin 27 to the knife 40 and a pin 51 to the frame member 20. Thus, because of the link connection, whenever one pivots the other will pivot. Further, by the application of a lifting force intermediate the ends of the link, applied in an arcuate path upward and forward, the member 20 is urged to pivot faster than the knife 40.

Closing is the first action in the full sequence. The portion of the wire forward of the knives is clamped by the jaws, and the knives are closed to cut into the insulation. Thereafter, the knives are caused to move as a unit to strip the severed portion of the insulation off the end of the wire.

To allow the knives to move after closing, the end of member 20 is slotted, as indicated by reference character 23. Pin 51 is slidable in slot 23. A friction nut 52 provides an adjustable degree of resistance against sliding movement of pin 51 in slot 23, but not enough to prevent such movement. Further, slot 23 has a detent surface 29 at the forward end, whereby the pin 51 acts as a cam follower pressed into this detent by the upward and forward movement. Thus, the friction nut 52 can be tightened to the degree needed for the overall resistance to travel, and the detent serves the purpose of providing a greater initial resistance.

The handles 11, 21 are in the form of pistol grip type handles and the handle 11 is fixed to frame 10. When the friction nut 52 is properly tightened and the handles are positioned away from each other, the jaws 12, 22 are in an open position and likewise the knife blades 31, 41 are also in an open position. When the handles 11, 21 are squeezed together, the combined force of the friction nut 52 abutting against the upper frame member 20 and the abutment of the cam surface detent 29 and the cam follower 51 provides a reaction force greater than the force required to cause the first and second jaws 12, 22 to pivot to a closed position, and which force is also greater than the force required to cause the knife blades 31, 41 to pivot to a closed position.

Thus, upon squeezing the handles together, the initial result is that the jaws and knife blades each move toward their closed position. Upon continued squeezing of the handles together, the force exerted by the friction nut 52 and the abutment of the cam follower 51 in detent 29 is overcome and the slide carriage 35 and the cam follower 51 will move respectively in the mounting slot 14 and the camming slot 23. Since both knives 30, 40 are mounted to slide carriage 35, they will be moved with the slide carriage 35, thus causing them to move away from the jaws 12, 22 to a rearward position. The slide carriage 35 is provided with a rear stop shoulder 36 which will abut the rear of the mounting slot 14 limiting the amount of movement. A handle spring 53 is provided which will urge the handles into a normally widely spaced position.

An eccentric shear member stop 54 is rotatively carried by the lower knife 30 and positioned to abut the upper knife 40, thus enabling an adjustment of amount of pivotal movement of the knife blades to the closed position. Further, the upper and lower knives 30, 40 are relatively movable toward and away from the jaws 12, 22.

Figure 5:
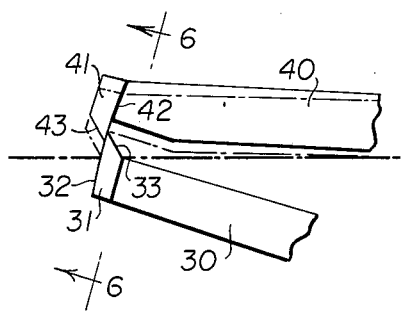
FIGURE 5 is a detailed view of the blade members.
Figure 6:
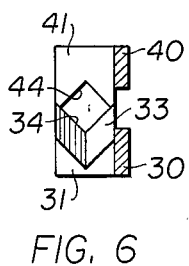
FIGURE 6 is a view of the blade members as seen along the plane represented by the line 6—6 of FIGURE 5; and, FIGURE 7 is a schematic simplified diagram indicating the angular relationships between the blade angles and the wire path of travel.
Figure 7:
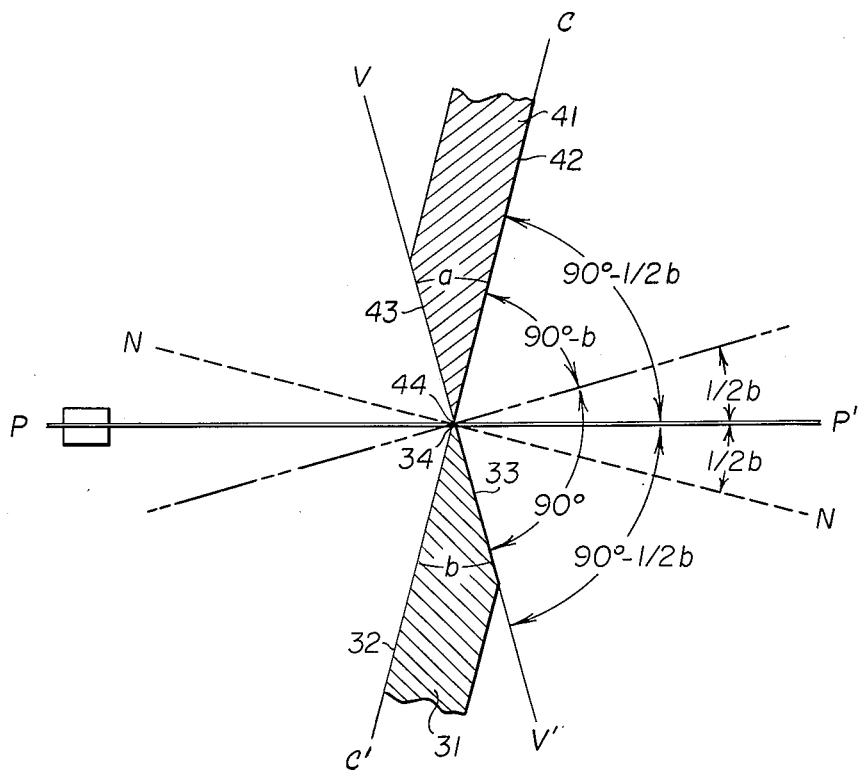

Referring now particularly to FIGURES 5, 6 and 7, the configuration and angular relationship of the blades are shown which determine a natural path of relative travel between the knife blades and the wire to be stripped.

The knife blade 31 has a slightly curved reference face 32 and an inclined face 33. The reference face 32 and the inclined face 33 meet at a first knife blade cutting edge 34. The second knife blade 41 also has a slightly curved reference face 42 and an inclined face 43. The inclined face 43 and reference face 42 meet at a second knife blade cutting edge 44. The reference faces are curved to conform to the arc along which the knife blades move from the open position to the closed position. However, the curvature is small and for practical purposes of calculation and description the reference faces can be treated as if they were flat, and are so treated throughout the remainder of this description. FIGURES 5 and 6 show the actual design of the blades. In order to get a full 360° cut into the insulation, each of the cutting edges 34, 44 are in the form of a V-shaped notch. In order to retain a constant angle between the inclined faces and the reference faces each inclined face has two sections; each section meets the reference face of its respective blade at the same angle along the cutting edge.

Referring now particularly to FIGURE 7, a simplified diagram is used to show the relationship between the inclined faces and the reference faces which are shown flat for simplicity. The angle between the reference face 32 and the inclined face 33 is designated by the small letter "b" and the angle between the reference face 42 and the inclined face 43 is designated by the small letter "a." In the preferred and disclosed embodiment "a" and "b" are each equal to 30°.

The knife blades 31, 41 are so positioned that the reference faces 32, 42 meet along a path of contact which appears in FIGURE 7 as a plane designated by the line C—C'. The shear blades 31, 41 are mirror images of each other on the plane C—C'. Since angles "a" and "b" are equal, the inclined faces 33, 43, also meet along a plane which is designated by the line V—V'. Assuming that the direction of wire travel with respect to the blades is from right to left then there is a shearing angle formed along the line C—V'. The angle C—V' is equal to 180° minus "b", which, in the preferred and disclosed embodiment is equal to 150° (180° minus 30°). It has been found that as thus formed, the knife blades 31, 41 establish a natural path of relative travel between the wire and the knife blades along a plane that bisects the angle formed by C—V' and which path of travel is thus inclined from a plane N—N' normal to the plane C—C' by an amount equal to one-half the angle "b" or 15°. The natural path of relative travel which an unrestricted wire will follow is designated by P—P' and in FIGURE 7 the relative direction of the movement of the wire with respect to the shear blades is from P' to P.

It has also been found that when the angle C—V' is less than 180° and the path of travel of the wire with respect to the blades is from P' to P, a funneling action is promoted. This funneling action causes a force to act upon the insulation that has been severed from the remainder of the insulation and is being pushed along on the wire which force causes a portion of the insulation to be urged back around the edges 34, 44 thus causing a padding of the edges which in turn assists in preventing nicking of the wire.

Referring again to FIGURES 1, 2, 3 and 4, the jaws 12, 22 are matable on a plane of contact. The knife blades 31, 41 are positioned to mate in such a manner that the path of contact C—C' of the reference faces is angled with respect to the plane of contact of the jaws an amount equal to one-half of the angle which thus places the plane of contact of the jaws on the path of travel P'—P; or, expressed another way, the natural path of travel P'—P lies on the plane of contact between the jaws.

The force exerted by the friction nut against the second frame member 20 is greater than the force required to move the jaws 12, 22 into an open position and likewise is greater than the force required to move the knife blades 31, 41 to open position. Thus, after the handles have been squeezed together and the pressure is released from them, the force of the handle spring 53 causes the jaws 22, 12 and the knife blades 31, 41 to first pivot to their open positions and thereafter the carriage 35 and the cam follower 51 to move forward respectively in the mounting slot 14 and camming slot 23, thus causing the knife blades 31, 41 and the jaws 12, 22 to move to a forward position. The movement continues until a front stop shoulder 37 of the carriage abuts the front of the mounting slot.

The stripping of a wire is accomplished in the following manner. The end of the wire to be stripped is placed between the jaws and the knife blades and allowed to extend beyond the knife blades the distance to which the insulation is to be stripped. The shear member stop 54 is rotated to allow a desired amount of shearing into the insulation. Indicia marks 55 may be placed on the stop 54 and an index mark 56 on the upper knife 40 to indicate the proper setting for different size wire. The handles 11, 21 are squeezed together, which will close the jaw members 12, 22 and the knife blades 31, 41. The knife blades, upon closing, will bite into the insulation to a depth dependent upon the setting of the eccentric stop 54, and which distance when properly selected is such that the knife blades 31, 41 will not shear completely through to the current carrying center. The wire will extend from the jaws through the knife blades on the natural path of travel P'—P. After the jaws have firmly closed against the wire and the knife blades have partially cut into the insulation of the wire, the continued squeezing of the handles will cause the knife blades to move away from the jaw members on path P—P' thus pulling the insulation away from the wire by means of relative movement between the wire and the knife blades along path P'—P. After the cut insulation has been pulled free from the rest of the wire by the movement of the knife blades 31, 41, the handles are released. The jaws and knife blades will pivot to their open positions and then the knives will move to the forward position.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A wire stripping tool comprising, wire gripping means, first and second wire insulation cutting blades, means mounting said blades for relative movement between an open position and a closed mating position, each of said blades having a reference face an an inclined face, said inclined face of said first blade forming the same angle with the reference face of said first blade as said inclined face of said second blade forms with said reference face of said second blade, said first and second blades being mated such that the reference faces of each lie in a substantially planar, predetermined path of closing contact, said mated blades and said wire gripping means together at least partially defining a natural path of relative wire travel in angular position with respect to the faces of said blades, said path of travel being inclined to the normal of the plane on which said reference faces lie by an amount equal to approximately one-half the angle of each inclined face with its reference face, said wire gripping means being positioned to maintain a wire to be stripped on said path of travel, and means to cause relative movement on said path of travel between said blades and a wire maintained on said path of travel.

2. The tool as claimed in claim 1 wherein said means to cause relative movement comprises means for shifting said blades toward and away from said wire gripping means.

3. A wire stripping tool comprising, a first frame member having a first wire gripping jaw at one end and a fixed handle at the other end, a second frame member having a second wire gripping jaw at one end and an elongated camming slot at the other end, said first and second frame members being pivotally connected intermediate their opposite ends, said first and second jaws being mated and pivotally movable between an open position wherein the jaws are relatively widely spaced and a closed position wherein the jaws are abutting defining a plane of contact therebetween, said first frame member having an elongated mounting slot formed intermediate in opposite ends, a slide carriage slidably mounted in said mounting slot, a first knife member having a first wire insulation cutting blade at one end and mounted to said slide carriage at the other end, said slide carriage being abuttable against opposite ends of the mounting slot, a second knife member having a blade at one end and a link pivotally mounted at the other end, said first and second knife members being pivotally connected intermediate their opposite ends, said first and second blades being pivotally movable between an open position wherein the blades are relatively widely spaced and a closed position wherein the blades are relatively closely spaced, said blades being aligned with said jaws and located between the opposite ends of said frame members when in said closed position, said blades each having a reference face and an inclined face angled with respect to each other, said reference faces having a path of contact, said blades being mirror images of each other on the path of contact of the reference faces, said reference faces being angled with respect to the plane of contact of said jaws and amount equal to approximately one-half the angle of the inclined faces and reference faces, a rotatable eccentric adjusting stop carried by said first knife member intermediate its opposite ends and abuttable with said second knife member intermediate its opposite ends to selectively limit the amount of pivotal movement of said blades to the closed position, said link having a cam follower spaced from the link's pivotal connection to said second jaw member and disposed in said camming slot, said cam follower having a friction adjustment nut threadably engaged thereon and adapted to abut said second jaw member, a second handle pivotally attached to said second knife member and pivotally attached to said link intermediate the cam follower and the pivotal attachment to said second shear member, said handles being relatively movable toward and away from each other, a spring urging said handles away from each other, said cam slot having a detent end in angular intimate contact with said cam follower and positioned to exert a force to resist movement of the cam follower in said camming slot when said handles are away from each other and urged toward each other, said handles positioned to urge the jaws and the blades into their open position when the handles are away from each, said handles positioned to urge the jaws and blades into their closed position when moved toward each other, the force required to move the blades and jaws into their closed position being less than the combined force exerted by the friction nut and detent end of the cam slot against the cam, and the force required to move the jaws and blades to their open position being less than the force exerted by said friction nut, whereby, when force is exerted moving the handles together, the jaws will move to a closed position to grip a wire and the blades will move together to partially shear the insulation, and thereafter the blades will move away from the jaws while both are in a closed position to strip insulation from the wire.

4. A wire stripping tool comprising frame means, a pair of pivotally cooperable jaws on said frame means for gripping a piece of insulated wire, a pair of cooperating shear blade means spaced from said jaws, means mounting said shear blade means on said frame for pivotal cooperation so that said shear blade means can be closed on said wire in a shearing plane to cut the insulation, said mounting means including a slide reciprocal on said frame in a path oblique to said shearing plane, linkage means connected to said shear blade means, and to one of said jaws, and actuating means connected to said slide and to said linkage means for sequentially closing said jaws and said shear blade means and thereafter moving said slide and said shear blade means away from said jaws.

5. A wire stripping device comprising frame means, a fixed wire gripping jaw on said frame means and a cooperating, pivotally connected jaw, a reciprocal slide carried by said frame means, a pair of pivotally cooperable knife members carried by said slide, said knife members including shear blade means cooperable to cut the insulation of a wire in a shearing plane, and means for sequentially closing said jaws and said knife members and thereafter actuating said slide to move said knife members away from said jaws in a path oblique to said shearing plane, said closing and actuating means including linkage means connected to said knife members and to said pivotally connected jaw, and an actuating lever connected to said slide and to said linkage means for first actuating said linkage means to close said jaws and said knife members and then moving said slide away from said jaws.

6. The device as claimed in claim 5 wherein said closing and actuating means further includes a cam slot in said pivotally connected jaw and a cam follower on said linkage means and slidably engaged in said slot.

7. The device as claimed in claim 6 including an adjustable eccentric stop on one of said knife members for defining the closed position of said shear blade means.

8. A wire stripping tool comprising, a first frame member having a first wire gripping jaw near one end and a handle near the other end, a second frame member having a second wire gripping jaw near one end an an elongated camming slot near the other end, said first and second frame members being pivotally connected intermediate their ends, said first and second jaws being mated and pivotally movable between an open position wherein the jaws are relatively widely spaced and a closed position wherein the jaws are abutting, said first frame member having an elongated mounting slot formed intermediate its ends, a slide carriage slidably mounted in said mounting slot, a first knife member mounted on said slide carriage and having a first wire insulation cutting blade near one end, said slide carriage being abuttable against the ends of the mounting slot, a second knife member having a link pivotally mounted thereon and a blade near one end, said first and second knife members being pivotally connected intermediate their ends, said first and second blades being pivotally movable between an open position wherein the blades are relatively widely spaced and a closed position wherein the blades are relatively closely spaced, said blades being near said jaws and located between the jaws and the opposite ends of said frame member, said blades each having a reference face and an inclined face angled with respect to each other, said reference faces having a path of contact, said blades being mirror images of each other on the path of contact of the reference faces, said reference faces being angled with respect to the plane of contact of said jaws an amount equal to approximately one-half the angle of the inclined faces and reference faces, stop means on one member abuttable with another member to limit the amount of pivotal movement of said blades to the closed position, said link having a cam follower spaced from the link's pivotal connection to said second jaw member and disposed in said camming slot, a second handle pivotally attached to said second knife member and pivotally attached to said link intermediate the cam follower and the pivotal attachment to said second shear member, said handles being relatively movable toward and away from each other, biasing means urging said handles way from each other, said cam slot having a detent end in contact with said cam follower and positioned to exert a force to resist movement of the cam follower in said camming slot when said handles are away from each other and urged toward each other, said handles positioned to urge the jaws and the blades into their open position when the handles are away from each, said handles positioned to urge the jaws and blades into their closed position when moved toward each other.

9. The tool as claimed in claim 1 wherein said blades are mirror images of each other on said substantially planar path of closing contact, and wherein the inclined face of each blade includes a substantially V-shaped notch so that said blades cooperate in said closed position to form a 360° insulation cut.

10. A wire stripping tool comprising wire gripping means, a pair of insulation cutting blades, each of said blades including a reference face and an inclined face which cooperate to define a cutting edge, each of said inclined faces having two sections which define a generally V-shaped notch in the respective cutting edge, said gripping means and said blades establishing a wire path, means mounting said blades for relative movement between an open position and a closed mating position in which said reference faces are mated in a shearing plane of closing contact, said shearing plane being oblique to said wire path, the direction of movement of said blades and cutting edges when said reference faces are brought into closing contact being substantially parallel to said shearing plane, and means connected between said gripping means and said blades for relatively moving said gripping means and said blades apart to effect an insulation stripping action after said blades have been brought together.

11. The tool as claimed in claim 10 wherein said means for relatively moving said gripping means and blades apart comprises means for relatively moving said blades away from said gripping means along a rectilinear path of travel coinciding with said wire path, said rectilinear path of travel bisecting the angle between the surfaces of said blades which are remote from said gripping means.

References Cited in the file of this patent

UNITED STATES PATENTS

| | | |
|---|---|---|
| 1,763,255 | Rankin | June 10, 1930 |
| 1,814,589 | Endsley | July 14, 1931 |
| 2,721,383 | Miller | Oct. 25, 1955 |

FOREIGN PATENTS

| | | |
|---|---|---|
| 364,863 | Italy | Nov. 16, 1938 |
| 450,369 | Italy | July 15, 1949 |
| 1,011,494 | Germany | July 4, 1957 |